United States Patent [19]

Brodt et al.

[11] Patent Number: 5,473,042
[45] Date of Patent: Dec. 5, 1995

[54] MATERIALS SUITABLE AS CROSSLINKABLE BINDER COMPONENTS

[75] Inventors: Gregor Brodt, Heppenheim; Thomas Wünsch, Speyer; August Lehner, Rödersheim; Albert Kohl, Laumersheim, all of Germany

[73] Assignee: BASF Magnetics GmbH, Mannheim, Germany

[21] Appl. No.: 370,608

[22] Filed: Jan. 10, 1995

[30] Foreign Application Priority Data

Jan. 12, 1994 [DE] Germany .................. 44 00 593.8

[51] Int. Cl.$^6$ .................. C08G 18/10; C08G 18/12
[52] U.S. Cl. .................. 528/59; 528/60; 528/61; 528/65; 528/85
[58] Field of Search .................. 528/59, 60, 61, 528/65, 85

[56] References Cited

U.S. PATENT DOCUMENTS

| | | | |
|---|---|---|---|
| 2,871,218 | 1/1959 | Schellenberger | 528/83 |
| 4,058,506 | 11/1977 | Vaeth et al. | 528/65 |
| 4,058,646 | 11/1977 | Vaeth et al. | 428/423.7 |
| 4,157,995 | 6/1979 | Schenck | 524/513 |
| 5,283,311 | 2/1994 | Narayan et al. | 528/59 |
| 5,418,310 | 5/1995 | Kangas | 528/59 |

FOREIGN PATENT DOCUMENTS

| | | |
|---|---|---|
| 2442762 | 3/1976 | Germany . |
| 2442763 | 3/1976 | Germany . |
| 2500921 | 7/1976 | Germany . |
| 2753693 | 6/1979 | Germany . |

*Primary Examiner*—Morton Foelak
*Attorney, Agent, or Firm*—Keil & Weinkauf

[57] ABSTRACT

A material suitable as crosslinking binder component for pigment-containing coatings and having an average molecular weight of from 25,000 to 150,000, obtainable by reacting a polyurethane comprising a diol having a molecular weight between 400 and 4,000, an aliphatic or cycloaliphatic diol of 2–18 carbon atoms, an aromatic diol of 8–36 carbon atoms, a trihydric or polyhydric alcohol of 3–18 carbon atoms, a polyhydric alcohol of 3–40 carbon atoms containing a tertiary amino group, and a diisocyanate of 3–34 carbon atoms with a compound containing one or more hydroxyl groups and one or more amino groups reactive toward isocyanate groups. The materials may be used as crosslinkable binder components for pigment-containing coatings, in particular for the production of magnetic recording materials.

7 Claims, No Drawings

MATERIALS SUITABLE AS CROSSLINKABLE BINDER COMPONENTS

The present invention relates to materials (I) suitable as cross-linkable binder components for pigment-containing coatings and having an average molecular weight of from 25,000 to 150,000, obtainable by reacting 1) a polyurethane (II) comprising
   a) 1 mol of a diol (III) having an average molecular weight of from 400 to 4,000,
   b) from 0.1 to 10 mol of an aliphatic or cycloaliphatic diol (IV) of 2 to 18 carbon atoms,
   c) from 0.1 to 10 mol of an aromatic diol (V) of 8 to 36 carbon atoms,
   d) from 0.01 to 8 tool of a trihydric or polyhydric alcohol (VI) of 3 to 18 carbon atoms,
   e) from 0.01 to 8 mol of a polyhydric alcohol (VII) of 3 to 40 carbon atoms which contains a tertiary amino group and
   f) an amount of a diisocyanate (VIII) of 6 to 30 carbon atoms such that the molar ratio of isocyanate groups to the total number of hydroxyl groups in (III) to (VII) is from 1.05:1 to 1.4:1, with 2) a compound (IX) which contains one or more hydroxyl groups and one or more amino groups reactive toward isocyanate groups, the amount of (IX) being such that the number of reactive amino groups corresponds to the number of isocyanate groups in the polyurethane (II)

The present invention furthermore relates to processes for the preparation of the materials, processes for the production of pigment-containing coatings with these materials, their use as binder components for pigment-containing coatings, articles containing such coatings and magnetic recording materials containing these materials as binder components.

Modern magnetic recording media have to meet a variety of requirements. On the one hand, magnetic properties, for example the residual induction and the switching field distribution, should ensure optimum utilization of the highly developed audio, video and data recording apparatuses. On the other hand, the mechanical properties should of course be such that optimum wear behavior, for example little or no abrasion, is guaranteed. For the development of such magnetic recording media, it is therefore important continuously to improve the magnetic layer, particularly with regard to parameters such as surface quality, flexibility and layer hardness. This can be done by using novel, improved binders. Many polyurethanes used as binders for magnetic recording layers are described in the patent literature to date, for example in DE-B 1 106 959, DE-B 2 500 921, DE-B 2 442 763 and DE-B 2 753 693.

Thus, DE-B 2 442 762 describes, for example, a magnetic recording medium based on a material finely distributed in a binder comprising at least 50% by weight of a thermoplastic polyurethane. Although the level of hardness of the magnetic layer in the case of these binders is singled out as an excellent property, the requirements at that time are by no means comparable with the present ones. The constantly increasing coating speeds and the necessity of achieving the final layer hardness are becoming increasingly significant. Furthermore, the requirements with regard to the mechanical properties of the magnetic recording media have increased many times over as a result of their use in increasingly broad fields of use, for example in electronic data processing and in particular in the portable playback apparatuses.

It is an object of the present invention to provide binders which have improved mechanical properties, such as tensile strength, hardness, abrasion resistance and resilience and a high cross-linking rate.

We have found that this object is achieved by the materials defined at the outset, processes for the preparation of the materials, processes for the production of pigment-containing coatings with these materials, their use as binder components for pigment-containing coatings, articles containing such coatings and magnetic recording materials containing these materials as binder components.

Polymers having this structure possess improved adhesive strength compared with those without these terminal groups. Furthermore, it is thus possible to increase the content of terminal OH groups, with the result that, on crosslinking with polyisocyanate, the degree of crosslinking can be varied within wide limits, according to the requirements for the magnetic layer. The urea groups, which increase the dispersibility compared with the conventional magnetic materials and improve the adhesive strength, are also advantageous.

The polyurethanes used according to the invention as binders in the magnetic layers generally have a pendulum hardness according to DIN 53 157 of from 20 to 130 s. They furthermore have a modulus of elasticity (according to DIN 53 457) of from 50 to 2500 $Nmm^{-2}$, an elongation at break of more than 70% (DIN 53 455) and a tensile strength of from 25 to 70 $Nmm^{-2}$ (DIN 53 455). The softening point is from 80° to 180° C. A pendulum hardness (DIN 53 157) of from 25 to 125 s, a modulus of elasticity of from 55 to 2000 $Nmm^{-2}$, an elongation at break of from 80 to 500% and a tensile strength of from 25 to 50 $Nmm^{-2}$ are particularly advantageous.

In comparison with the magnetic recording media obtained using the conventional thermoplastic polyurethane elastomers, the advantageous properties of the magnetic recording media having the composition according to the invention are evident even when a polyisocyanate is added before the application of the dispersion to the substrate. A large number of organic di-, tri- or polyisocyanates or isocyanate prepolymers having a molecular weight of up to 10,000, preferably from 500 to 3000, may be used for cross-linking. Polyisocyanates and isocyanate prepolymers which carry more than 2 NCO groups per molecule are preferred. Polyisocyanates based on toluylene diisocyanate, hexamethylene diisocyanate or isophorone diisocyanate, which are formed by polyaddition with di- or triols or by biuret and isocyanurate formation, have proven particularly suitable. An adduct of toluylene diisocyanate with trimethylolpropane and diethylene glycol is particularly advantageous.

For the preparation of the polyurethanes, a polydiol or a mixture of polydiols having a molecular weight of from 400 to 4000, preferably from 700 to 2500, is used as component A. The known polyesterols, polyetherols, polycarbonatediols, polycaprolactonediols and polysiloxanediols are suitable for this purpose.

The polyesterols are advantageously predominantly linear polymers having terminal OH groups, preferably those having 2 terminal OH groups. The acid number of the polyesterols is less than 10, preferably less than 3. The polyesterols can be prepared in a simple manner by esterification of aliphatic and/or aromatic dicarboxylic acids of 4 to 15, preferably 4 to 6, carbon atoms with glycols, preferably glycols of 2 to 25 carbon atoms, or by polymerization of lactones of 3 to 20 carbon atoms. For example, glutaric acid, pimelic acid, suberic acid, sebacic acid, dodecanoic acid and preferably adipic acid, azelaic acid, succinic acid and phthalic acids may be used as dicarboxylic acids. The dicarboxylic acids may be used individually or as mixtures. For the preparation of the polyesterols, it may be advantageous to use the corresponding acid derivatives, such as anhydrides or carbonyl chlorides, instead of the dicarboxylic acids. Suitable aromatic dicarboxylic acids are terephthalic acid, isophthalic acid or mixtures of these with other dicarboxylic acids, e.g. diphenic acid, sebacic acid, succinic acid and adipic acid. Examples of suitable glycols are diethylene glycol, 1,5-pentanediol, 1,10-decanediol and 2,2,4-trimethyl-1,5-pentanediol. 1,2-Ethanediol, 1,4-butanediol, 1,6-hexanediol, 2,2-dimethylpropane-1,3-diol, 1,4-dimethylolcyclohexane, 1,4-diethanolcyclohexane and ethoxylated/propoxylated products of 2,2-bis(4-hydroxyphenylene)propane (bisphenol A) are preferably used. Depending on the desired properties of the polyurethanes, the polyols may be used alone or as a mixture in various ratios. Examples of suitable lactones for the preparation of the polyesterols are $\alpha,\alpha$-dimethyl-$\beta$-propiolactone, $\gamma$-butyrolactone and preferably $\epsilon$-caprolactone.

The polyetherols are essentially linear substances which contain ether bonds and have terminal hydroxyl groups and a molecular weight of from about 600 to 4000, preferably from 1000 to 2000. Suitable polyetherols can readily be prepared by polymerization of cyclic ethers, such as tetrahydrofuran, or by reaction of one or more alkylene oxides, where the alkylene radical is of 2 to 4 carbon atoms, with an initiator molecule which contains two bound active hydrogen atoms in the alkylene radical. Examples of alkylene oxides are ethylene oxide, 1,2-propylene oxide, epichlorohydrin, 1,2- and 2,3-butylene oxide. The alkylene oxides may be used individually, alternately in succession or as a mixture. Examples of suitable initiator molecules are water, glycols, such as ethylene glycol, propylene glycol, 1,4-butanediol and 1,6-hexanediol, amines, such as ethylenediamine, hexamethylenediamine and 4,4'-diaminodiphenylmethane, and aminoalcohols, such as ethanolamine. As in the case of the polyesterols, the polyetherols too may be used alone or as mixtures. Polycarbonatediols are also useful. Suitable polycarbonatediols are those based on aromatic dihydroxy compounds, for example 4,4'-dihydroxydiphenyl-2,2-propane, or those based on aliphatic dihydroxy compounds, for example. 1,6-hexanediol. Polyethercarbonatediols, for example those based on polytetrahydrofuran, are also possible. The molecular weights range from 500 to 4000, preferably from 1000 to 2000.

Polysiloxanediols having terminal hydroxyalkyl groups bonded to the silicon have, for example, the following structure:

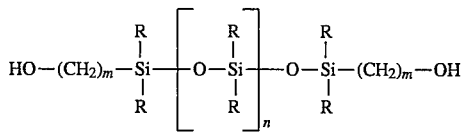

where m is 1
and n is 2–133
and R is a hydrocarbon radical of 1 to 20 carbon atoms.

Where R is $CH_3$, for example, the Baysilon® grades from Bayer or Tego® OF-1010 or Tego® OF-1025 from Goldschmidt may be used.

Diols of 2 to 18, preferably 2 to 10, carbon atoms, for example 1,2-ethanediol, 1,3-propanediol, 1,4-butanediol, 1,6-hexanediol, 1,5-pentanediol, 1,10-decanediol, 2-methyl-1,3-propanediol, 2,2-dimethyl-1,4-butanediol, 2-methyl-2-butyl-1,3-propanediol, neopentylglycol hydroxypivalate, diethylene glycol, triethylene glycol, 1,4-dimethylolcyclohexane and 1,4-diethanolcyclohexane, are used as building block B. The diols may be used individually or as mixtures. Diamines of 2 to 15 carbon atoms, such as ethylenediamine, 1,6-hexamethylenediamine, 4,9-dioxododecane-1,12-diamine or 4,4'-diaminodiphenylmethane, or aminoalcohols, e.g. monoethanolamine, monoisopropanolamine or 2-amino-2-methyl-pentan-2-ol, may also be used in minor amounts. It has proven advantageous to incorporate the resulting urea groups in the polymer chain. The urea groups at the chain end are of minor importance.

The stated diols as building blocks B may be wholly or partly replaced by water.

Diols of 8 to 36 carbon atoms which contain aromatic structures, e.g. bisphenol A, doubly symmetrically ethoxylated bisphenol A, doubly symmetrically propoxylated bisphenol A, bisphenol A derivatives having a higher degree of ethoxylation and propoxylation, corresponding bisphenol F derivatives, 2-phenyl-1,3-propanediol or 2-phenyl-1,4-butanediol, are used as building blocks C. The diols may be used individually or as mixtures.

Compounds of 3 to 18, preferably 3 to 8, carbon atoms are used as component D. Examples of corresponding components containing at least three OH groups are glycerol, trimethylolethane, trimethylolpropane, pentaerythritoland various sugar alcohols. Low molecular weight reaction products of, for example, trimethylolpropane with ethylene oxide and/or propylene oxide are also suitable. The presence of components having at least three OH groups in the polyaddition leads to branching of the end product, which, in the absence of local crosslinking, has an advantageous effect on the mechanical properties of the polyureaurethane. By using these components, more crosslinkable terminal groups can be introduced into the molecule and the crosslinking density thus increased.

Components E are tertiary aminoalcohols of 3 to 40, preferably 3 to 24, carbon atoms, which carry at least two OH groups, for example methyldiethanolamine, ethyldiethanolamine, propyldiethanolamine, methyldipropanolamine, ethyldipropanolamine, propyldipropanolamine, triethanolamine or tripropanolamine. The use of methyldiethanolamine and ethyldipropanolamine has proven particularly advantageous.

For the formation of the polyureaurethanes or NCO-containing intermediates, the building blocks stated under A, B, C, D and E are reacted with aliphatic, cycloaliphatic or aromatic diisocyanates of 6 to 30 carbon atoms (building block F). For example, compounds such as toluylene 2,4-diisocyanate, toluylene-2,6-diisocyanate, m-phenylene diisocyanate, 4-chlorophenylene 1,3-diisocyanate, naphthylene 1,5-diisocyanate, hexamethylene 1,6-diisocyanate, cyclohexylene 1,4-diisocyanate and tetrahydronaphthylene 1,5-diisocyanate, diphenylmethane 4,4'-diisocyanate, dicyclohexylmethane 4,4'-diisocyanate or isophorone diisocyanate are suitable for this purpose. Siloxane-containing diisocyanates may also be used. These siloxane-containing diisocyanates may account for up to 32 mol percent of the total molar amount of diisocyanate.

For the formation of OH-containing polyurethane urea elastomers, the NCO-containing intermediate of A to F is reacted with aminoalcohols (of 2 to 16 carbon atoms). These aminoalcohols of 2 to 16, preferably 3 to 6, carbon atoms include monoethanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)aniline. Diol amines are particularly suitable since the OH number of the polymers is doubled as a result of their addition at the chain end. Diethanolamine and diisopropanoldiamine have proven to be particularly advantageous.

The thermoplastic, resilient OH-containing polyurethanes having the stated composition are prepared in solution by the 2-stage process, in the presence or absence of catalysts and other assistants and/or additives. It is not possible to prepare these products by the solvent-free batch process. Since, owing to the presence of the triol and the reaction of amine with NCO groups in the polyaddition in the absence of a solvent, at least partial formation of gel particles occurs, the process is carried out in solution. In general, the danger of local overcrosslinking, as occurs in the polyaddition in the absence of a solvent, is avoided in the solution polyaddition.

Two different procedures are possible in the 2-stage process, depending on the reaction conditions (amount of solvent, heat of reaction).

Procedure 1: The diisocyanate is initially taken with a little solvent, after which building blocks A, B, C, D and E and if required the catalyst and the assistants and additives in solvents are added at from 20° to 90° C., preferably from 30° to 70° C., in the course of from 0.2 to 5 hours. The components are reacted until the desired NCO content is obtained, after which the stopping agent is added in the 2nd stage.

Procedure 2: In this process, all starting components A to F are dissolved in some of the solvent to give solutions having a solids content of from 15 to 50% by weight. The stirred solutions are then heated to 20°–90° C., preferably 30°–70° C., if necessary after the addition of a catalyst. The components are then reacted until the desired NCO content is obtained, after which the stopping agent is added in the 2nd stage.

In the 2-stage process, an excess of NCO relative to the building blocks A to E is used in the first stage. In both procedures, it is possible to begin the reaction in some of the solvent and to add the remaining solvent during or after the reaction.

Cyclic ethers, such as tetrahydrofuran and dioxane, and cyclic ketones, such as cyclohexanone, are preferably used as solvents for the preparation of polyurethanes. Depending on the field of use, the polyurethanes can of course also be dissolved in other strongly polar solvents, such as dimethylformamide, N-methylpyrrolidone, dimethyl sulfoxide or ethylglycol acetate. It is also possible to mix the stated solvents with aromatics, such as toluene or xylene, esters, such as ethyl or butyl acetate, or ketones, e.g. methyl ethyl ketone.

Examples of suitable catalysts for the preparation of the polyurethanes and for the crosslinking reaction are tertiary amines, such as triethylamine, triethylenediamine, N-methylpyridine and N-methylmorpholine, metal salts, such as tin octoate, lead octoate and zinc stearate, and organometallic compounds, such as dibutyltin dilaurate. The suitable amount of catalyst is dependent on the activity of the relevant catalyst. In general, it has proven advantageous to use from 0.005 to 0.3, preferably from 0.01 to 0.1, part by weight per 100 parts by weight of polyurethane.

The polyurethanes used according to the invention may be employed as sole binders for the production of magnetic layers, but, for specific intended uses of magnetic recording media according to the invention, it is advantageous to add a second binder component in amounts of from 5 to 50, preferably from 10 to 40, parts by weight, based on the resulting total amount of binder. The physically drying binders present in the binder mixture are known. They include a polyvinylformal binder which was prepared by hydrolysis of a polymer of a vinyl ester and subsequent reaction of the vinyl alcohol polymer with formaldehyde. The polyvinylformals advantageously contain at least 65, in particular at least 80% by weight of vinylformal groups. Suitable polyvinylformals contain from 5 to 13% by weight of vinyl alcohol groups and from 80 to 88% by weight of vinylformal groups and have a density of about 1.2 and a viscosity of from 50 to 120 mPa.s, measured at 20° C. using a solution of 5 g of polyvinylformal in 100 ml of 1:1 phenol/toluene. In addition to the polyvinylformal, vinyl chloride/diol mono- or di(meth)acrylate copolymers, which can be prepared; for example, in a conventional manner by solution copolymerization or suspension copolymerization of vinyl chloride and the diol monomethacrylate or monoacrylate, are also suitable. The diol mono- or diacrylate or mono- or dimethacrylate used for this purpose is an esterification product of acrylic acid or methacrylic acid with a corrresponding molar amount of an aliphatic diol of 2 to 4 carbon atoms, such as ethylene glycol, 1,4-butanediol or, preferably, propanediol, the last-mentioned compound preferably consisting of 1,3-propanediol and from 0 to 50% by weight of 1,2-propanediol. The copolymers advantageously have a vinyl chloride content of from 50 to 95% by weight and a diol acrylate or methacrylate content of from 5 to 50% by weight. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/propanediol monoacrylate copolymers, in a mixture of equal amounts by volume of tetrahydrofuran and dioxane, has a viscosity of about 30 mPa.s at 25° C. The K value according to H. Fikentscher (Celluloschemie 13 (1932), 58 et seq.) of the particularly suitable products is from 30 to 50, preferably about 40.

In addition, phenoxy resins whose constitution may be described by repeating units of the formula

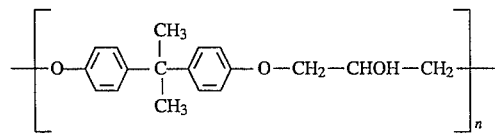

where n is roughly 100, may advantageously be used. These are polymers such as those known under the tradenames Epikote® from Shell Chemical Co. or under the name epoxy resin PKHH® from Union Carbide Corporation.

Cellulose ester binders are also suitable for use in the binder mixture defined. These are esterification products of cellulose with nitric acid or with carboxylic acids of 1 to 4 carbon atoms, for example cellulose acetate, cellulose triacetate, cellulose acetopropionate or cellulose acetobutyrate.

The further processing of the binder mixture with magnetic materials and assistants to give the novel magnetic recording media is carried out in a manner known per se.

The pigments known per se, which substantially influence the properties of the resulting magnetic layers, for example gammairon(III) oxide, finely divided magnetite, ferromagnetic undoped or doped chromium dioxide, cobalt-modified gamma-iron(III) oxide, barium ferrite or ferromagnetic particles, may be used as anisotropic magnetic materials. Acicular cobalt-modified or unmodified gamma-iron(III) oxide, ferromagnetic chromium dioxide and metal pigment are preferred. The particle size is in general from 0.2 to 2 μm, preferably from 0.3 to 0.8 μm.

Furthermore, the magnetic layers may, in a manner known per se, contain additives, such as dispersants and lubricants, as well as fillers, which are admixed during dispersing of the magnetic pigments or during the production of the magnetic layer. Examples of such additives are fatty acids and isomerized fatty acids, such as stearic acid or salts thereof with metals of the first to fourth main groups of the Periodic Table of Elements, amphoteric electrolytes, such as lecithin, and fatty esters or waxes, silicone oils, carbon black, etc. The amount of the additives is a conventional amount and is in general less than 6, preferably less than 3% by weight, based on the magnetic layer.

The ratio of magnetic material to binder in the novel recording materials is from 1 to 10, in particular from 3 to 6, parts by weight of magnetic material per part by weight of the binder mixture. It is particularly advantageous that, owing to the excellent pigment binding power of the special polyurethanes, high magnetic material concentrations in the magnetic layers are possible without the mechanical and elastic properties being adversely affected or the performance characteristics suffering markedly.

The nonmagnetic and nonmagnetizable substrates used may be the conventional rigid or flexible substrates, in particular films of linear polyesters, such as polyethylene terephthalate, in general having a thickness of from 4 to 200 µm, in particular from 6 to 36 µm. Recently, the use of magnetic layers on paper substrates for electronic computing and accounting machines has also become important; the novel coating materials may advantageously be used for this purpose too.

The novel magnetic recording media may be produced in a manner known per se. Advantageously, the magnetic pigment dispersion prepared in a dispersing apparatus, for example a tubular ball mill or a stirred ball mill, from the magnetic material and a solution of the binder with the addition of dispersants and other additive is, if required, mixed with the polyisocyanate cross-linking agent and is then filtered and applied to the nonmagnetic substrate using a conventional coating apparatus, for example a knife coater.

As a rule, magnetic orientation is carried out before the liquid coating mixture is dried on the substrate; the latter is advantageously effected in the course of from 10 to 200 seconds, at from 50° to 90° C. The magnetic layers can be calendered and compacted on conventional machines by being passed between heated and polished rollers, if necessary with the application of pressure and at from 25° to 100° C., preferably 60° to 80° C. In the case of crosslinking binders, it has proved very advantageous to carry out the calendering before the crosslinking is complete, since the OH polymers in the uncrosslinked state are very thermoplastic without being tacky. The thickness of the magnetic layer is in general from 0.5 to 20 µm, preferably from 1 to 10 µm. In the case of the production of magnetic tapes, the coated films are slit in the longitudinal direction into the usual widths generally specified in inches.

In the examples and comparative experiments which follow, parts and percentages are by weight, unless stated otherwise. Parts by volume bear the same relation to parts by weight as that of the liter to the kilogram.

EXAMPLES

Polymer A (comparison)

21,000 parts of a polyesterdiol obtained from adipic acid and 1,4-butanediol (molecular weight about 1000), 2275 parts of 1,4-butanediol, 200 parts of ethoxylated bisphenol A and 134 parts of trimethylolpropane, together with 13,125 parts of diphenylmethane 4,4'-diisocyanate, were dissolved in 147,980 parts of tetrahydrofuran and heated to 60° C. in a heatable reaction vessel having a capacity of 300,000 parts and equipped with a stirrer and a reflux condenser. The components were reacted until a final viscosity of 1.8 Pa.s (at 60° C.) was reached. The NCO content was 0.07%. Dilution was then effected with 76,232 parts of tetrahydrofuran to a solids content of 16.5%. At the same time, the reaction was stopped by adding 261 parts of diethanolamine. The K value of the polymer formed was 58, measured as a 1% strength solution in dimethylformamide.

Polymer B 21,000 parts of a polyesterdiol obtained from adipic acid and 1,4-butanediol (molecular weight about 1000), 1900 parts of 1,4-butanediol, 200 parts of ethoxylated bisphenol A, 500 parts of N-methyldiethanolamine and 134 parts of trimethylolpropane, together with 13,125 parts of diphenylmethane 4,4'-diisocyanate, were dissolved in 148,480 parts of tetrahydrofuran and heated to 60° C. in a heatable reaction vessel having a capacity of 300,000 parts and equipped with a stirrer and a reflux condenser. The components were reacted until a final viscosity of 1.9 Pa.s (at 60° C.) was reached. The NCO content was 0.07%. Dilution was then effected with 76,490 parts of tetrahydrofuran to a solids content of 16.5%. At the same time, the reaction was stopped by adding 261 parts of diethanolamine. The K value of the polymer formed was 63, measured as a 1% strength solution in dimethylformamide.

Polymer C 21,000 parts of a polyesterdiol obtained from adipic acid and 1,4-butanediol (molecular weight about 1000), 1400 parts of 1,4-butanediol, 200 parts of ethoxylated bisphenol A, 1000 parts of N-methyldiethanolamine and 134 parts of trimethylolpropane, together with 13,125 parts of diphenylmethane 4,4'-diisocyanate, were dissolved in 148,480 parts of tetrahydrofuran and heated to 60° C. in a heatable reaction vessel having a capacity of 300,000 parts and equipped with a stirrer and a reflux condenser. The components were reacted until a final viscosity of 1.3 Pa.s (at 60° C.) was reached. The NCO Content was 0.07%. Dilution was then effected with 76,490 parts of tetrahydrofuran to a solids content of 16.5%. At the same time, the reaction was stopped by adding 261 parts of diethanolamine. The K value of the polymer formed was 49, measured as a 1% strength solution in dimethylformamide.

Polymer D 21,000 parts of a polyesterdiol obtained from adipic acid and 1,4-butanediol (molecular weight about 1000), 200 parts of ethoxylated bisphenol A, 3000 parts of N-methyldiethanolamine and 134 parts of trimethylolpropane, together with 13,125 parts of diphenylmethane 4,4'-diisocyanate, were dissolved in 150,880 parts of tetrahydrofuran and heated to 60° C. in a heatable reaction vessel having a capacity of 300,000 parts and equipped with a stirrer and a reflux condenser. The components were reacted until a final viscosity of 1.2 Pa.s (at 60° C.) was reached. The NCO content was 0.07%. Dilution was then effected with 77,726 parts of tetrahydrofuran to a solids content of 16.5%. At the same time, the reaction was stopped by adding 261 parts of diethanolamine. The K value of the polymer formed was 48, measured as a 1% strength solution in dimethylformamide.

Determination of the crosslinking rate

To determine the crosslinking rate with isocyanate prepolymers, 100%, based on the OH number of the polyureaurethane binder, of a reaction product of toluylene diisocyanate with trimethylolpropane and diethylene glycol were added to said binder. The course of the reaction was monitored quantitatively by means of IR spectroscopy. For this purpose, the decrease in the integrated area of the isocyanate band between 2435 $cm^{-1}$ and 2148 $cm^{-1}$ was determined.

The results are recorded in Table 1.

TABLE 1

| Reaction time [h] | Conversion [%] | | | |
|---|---|---|---|---|
| | A Polymer | B Polymer | C Polymer | D Polymer |
| 0 | 0.0 | 0.0 | 0.0 | 0,0 |
| 0.5 | 4.4 | 5.6 | 21.3 | 41.8 |
| 1 | 4.3 | 9.4 | 31.5 | 63.4 |
| 2 | 6.4 | 18.6 | 47.2 | 81.4 |
| 3 | 7.1 | 34.9 | 57.7 | 88.0 |
| 4 | 8.2 | 40.6 | 64.9 | 90.3 |
| 5 | 9.0 | 46.0 | 73.1 | 91.5 |
| 6 | 10.6 | 51.5 | 78.1 | 91.4 |

We claim:

1. A material (I) suitable as crosslinkable binder component for pigment-containing coatings and having an average molecular weight of from 25,000 to 150,000, obtainable by reacting
   1) a polyurethane (II) comprising
      a) 1 mol of a diol (III) having an average molecular weight of from 400 to 4,000,
      b) from 0.1 to 10 mol of an aliphatic or cycloaliphatic diol (IV) of 2 to 18 carbon atoms,
      c) from 0.01 to 10 mol of an aromatic diol (V) of 8 to 36 carbon atoms,
      d) from 0.01 to 2 mol of a trihydric or polyhydric alcohol (VI) of 3 to 18 carbon atoms,
      e) from 0.01 to 8 mol of a polyhydric alcohol (VII) of 3 to 40 carbon atoms which contains a tertiary amino group and
      f) an amount of a diisocyanate (VIII) of 6 to 34 carbon atoms such that the molar ratio of isocyanate groups to the total number of hydroxyl groups in (III) to (VII) is from 1.05:1 to 1.4:1,
   with
   2) a compound (IX) which contains one or more hydroxyl groups and one or more amino groups reactive toward isocyanate groups, the amount of (IX) being such that the number of reactive amino groups corresponds to the number of isocyanate groups in the polyurethane (II).

2. A material as claimed in claim 1, obtainable from an amine of the formula IXa or IXb as compound (IX) where
   $R^1$ and $R^2$ are each $C_1$–$C_{10}$-alkylene and
   $R^3$ is hydrogen or $C_1$–$C_{11}$-alkylene.

3. A process for the preparation of a material (I) as claimed in claim 1, wherein
   1) a polyurethane (II) comprising
      a) 1 mol of a diol (III) having an average molecular weight of from 400 to 4,000,
      b) from 0.1 to 10 mol of an aliphatic or cycloaliphatic diol (IV) of 2 to 18 carbon atoms,
      c) from 0.01 to 10 mol of an aromatic diol (V) of 8 to 36 carbon atoms,
      d) from 0.01 to 2 mol of a trihydric or polyhydric alcohol (VI) of 3 to 18 carbon atoms,
      e) from 0.01 to 8 mol of a polyhydric alcohol (VII) of 3 to 40 carbon atoms which contains a tertiary amino group and
      f) an amount of a diisocyanate (VIII) of 6 to 34 carbon atoms such that the molar ratio of isocyanate groups to the total number of hydroxyl groups in (III) to (VII) is from 1.05:1 to 1.4:1,
   is reacted with
   2) a compound (IX) which contains one or more hydroxyl groups and one or more amino groups reactive toward isocyanate groups, the amount of (IX) being such that the number of reactive amino groups corresponds to the number of isocyanate groups in the polyurethane (II).

4. A process for the production of a coating, wherein a cross-linkable material as claimed in claim 1 is applied, together with a polyvalent isocyanate (X), to a substrate and the crosslinking reaction of (I) and (X) is then carried out.

5. An article provided with a coating as claimed in claim 1.

6. An article provided with a coating as claimed in claim 1, in which the pigment is a magnetic pigment.

7. A magnetic recording material containing a material as claimed in claim 1 as a coating material component.

* * * * *